Jan. 17, 1967 J. A. MINES 3,299,215

BIPOLAR TRANSISTOR AMPLIFIER FOR TELEPHONE SET USE

Filed Dec. 16, 1963

INVENTOR
J. A. MINES
BY R. B. Anderson
ATTORNEY 3,299,215
BIPOLAR TRANSISTOR AMPLIFIER FOR TELEPHONE SET USE James A. Mines, Middlesex, N.J., assignor to Bell Telephone Laboratories, Incorporated, New York, N.Y., a corporation of New York Filed Dec. 16, 1963, Ser. No. 331,062
7 Claims. (Cl. 179—81)

Figure 1:
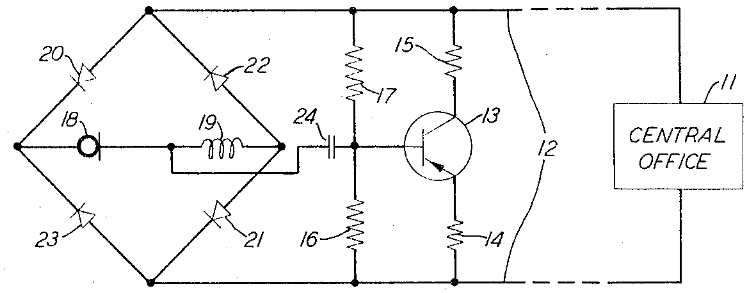

This invention relates generally to transistor amplifiers and more particularly to transistor amplifiers of a type suitable for use in improving the transmitting efficiency of a telephone set.

When line losses are excessive or shunting effects are severe, transistor amplifiers are sometimes used in subscriber or operator telephone sets to improve transmitting efficiency. Since the transmitting element in the usual telephone set is powered by direct current received over the line from the central office, such amplifiers usually make use of that current for their operating biases. Because direct current received from the central office may be inverted in polarity under some conditions of operation, such amplifiers are commonly coupled to the line through polarity guards which, typically, are diode bridges serving to route all direct line current through the emitter-collector path of the transistor in the same direction. An example of such an amplifier and its polarity guard is disclosed in United States Patent 2,831,067, which issued April 15, 1958, to H. W. Bryant.

Use of a polarity guard in connection with a transistor amplifier in a telephone set, however, occasionally gives rise to a problem in that the same line losses or shunting effects which requires that an amplifier be used also limit the amount of direct current that is available for providing operating biases. A polarity guard occasions some additional loss in its diodes and, as a result, the voltage available to operate the transistor amplifier in a telephone set can be insufficient under marginal condition.

A principal object of the invention is, therefore, to increase the voltage that is available to operate a transistor amplifier in a telephone set.

A closely related object is to eliminate the direct voltage loss caused by a polarity guard in a transistor amplifier used to increase transmitting efficiency in a telephone set.

In accordance with the invention, a transistor amplifier in either a subscriber or an operator telephone set is made to operate in bipolar fashion by connecting the emitter-collector path of the transistor across the line and using a polarity sensitive gate to connect the telephone set transmitter between the transistor base and emitter electrodes when direct current of normal polarity is received from the central office and between the transistor base and collector electrodes when direct current of reversed polarity is received from the central office. The transistor operates normally in the first instance and inversely, with the emitter assuming the role of the collector and the collector assuming the role of the emitter, in the second. In both modes of operation, however, substantially all of the available direct line voltage is applied to the emitter-collector path of the amplifying transistor, insuring maximum gain.

In at least one preferred embodiment of the invention, a diode bridge is used to switch the connection of the telephone set transmitter in accordance with the polarity of the direct current received from the central office. In this embodiment, the transmitter and an inductor are connected in series across one diagonal of the bridge. The other diagonal of the bridge is connected substantially in parallel with the emitter-collector path of the transistor across the line and the junction between the transmitter and the inductor is coupled to the base of the transistor. The diodes in the respective bridge arms perform the dual functions of supplying direct energizing current to the telephone set transmitter and switching the connection of the transmitter to the input side of the transistor amplifier to fix the latter's mode of operation.

In accordance with a feature of the invention the gain of the transistor amplifier is both equalized for its two modes of operation and stabilized by a respective voltage divider connected across the line from the base electrode of the amplifying transistor. The arms of the voltage divider fix the bias on the base electrode to equalize the gain and also, in cooperation with the inductor connected to the diode bridge, provide gain-stabilizing negative shunt feedback. Additional negative series feedback may be provided for both modes of operation by individual resistors connected in series with the respective emitter and collector electrodes of the transistor.

Figure 2:
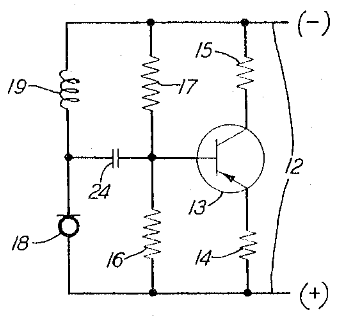
Figure 3:
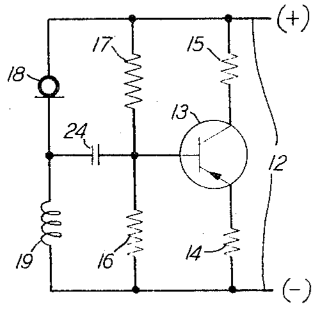

A more complete understanding of the invention and its advantages may be obtained from a study of the following detailed description of a specific embodiment. In the drawing:

FIG. 1 is a schematic diagram of the transmitting portion of a telephone set making use of the invention; and FIGS. 2 and 3 are simplified schematic diagrams showing the different modes of operation provided by the invention for normal and reversed voltage received from the central office.

In the embodiment of the invention illustrated in FIG. 1, a telephone central office 11 is connected to a subscriber or operator telephone set by a subscriber line 12. The telephone set is conventional but for clarity only the transmitting elements are shown. The relation of the receiving elements to the illustrated transmitting elements may, for example, be that illustrated in the above-identified Bryant patent.

In addition to receiving speech signals from the telephone set central office 11 supplies a direct voltage, called central office battery, to the telephone set for operating the transmitter and the illustrated transistor amplifier. This voltage may be of either polarity, depending upon operating conditions.

Transmitting gain is provided in the embodiment of the invention shown in FIG. 1 by a p-n-p transistor 13 which has its emitter-collector path connected across subscriber line 12 with a small feedback resistor 14 in series with the emitter and a small feedback resistor 15 in series with the collector. A voltage divider composed of a pair of resistors 16 and 17 is connected across line 12 in parallel with the emitter-collector path of transistor 13 to fix the operating bias on the base electrode. The telephone set transmitter 18, which may, for example, be a conventional carbon microphone, is connected in series with an inductor 19 across one diagonal of a four-terminal bridge made up of four semiconductor diodes 20, 21, 22, and 23. The other diagonal of the bridge is connected across subscriber line 12 in parallel with the emitter-collector path of transistor 13. As illustrated, the diodes are poled so that diodes 20 and 22 are similarly poled to form one series path from one side of the inductor 19 to the opposite side of transmitter 18 and diodes 21 and 23 are similarly poled to form another. The junction between transmitter 18 and inductor 19 is coupled through a capacitor 24 to the junction of resistors 16 and 17 and the base electrode of transistor 13. Capacitor 24 has sufficient capacity to avoid reducing the low frequency gain of the transistor amplifier to any significant degree.

The normal central office battery voltage supplied over subscriber line 12 in FIG. 1 is positive at the emitter of transistor 13 and negative at the collector. Under such conditions, transmitter 18 is energized by current flowing from the bottom conductor of line 12 through diode 23, transmitter 18, inductor 19, and diode 22 to the top conductor of line 12. Diodes 20 and 21 are back biased. The effective circuit is, therefore, that illustrated in FIG.

2. Transmitter 18 is coupled between the base and emitter electrodes of transistor 13, which operates in the common-emitter mode to amplify the voice frequency waves generated by transmitter 18 for transmission to the central office over subscriber line 12. The amplifier has both series and shunt negative feedback for gain stability. Series feedback is provided by resistor 14 in the emitter circuit of transistor 13, while shunt feedback is provided by inductor 19 and biasing resistor 16. The shunt feedback decreases with frequency, since the reactance of inductor 19 increases with frequency, giving the transistor amplifier a rising gain versus frequency characteristic which substantially matches the response characteristic of the carbon transmitter itself.

When reversed central office battery voltage is supplied over line 12 in FIG. 1, transmitter 18 is energized by current flowing from the top conductor of line 12 through diode 20, transmitter 18, inductor 19, and diode 21 to the bottom conductor of line 12. Diodes 22 and 23 are back biased. The effective circuit is then that illustrated in FIG. 3. Transmitter 18 is coupled between the base and collector electrodes of transistor 13, which operates in the inverse mode, with its emitter electrode assuming the role of the collector and its collector electrode assuming the role of the emitter. The amplifier is still effectively a common-emitter transistor amplifier. Because the transistor is not symmetrical, the inverse transistor Beta (common-emitter current amplification factor) is less than the normal transistor Beta. Compensation is made by fixing the relative values of resistors 16 and 17, and hence the bias on the base electrode of transistor 13, so that the gain is the same for both polarities of central office battery voltage. As before, the amplifier has both series and shunt negative feedback for gain stability. Series feedback is provided by resistor 15 in the collector circuit of transistor 13, while shunt feedback is provided by inductor 19 and biasing resistor 17. As in FIG. 2, the shunt feedback decreases with frequency giving the amplifier a desirable rising gain versus frequency characteristic.

For use in connection with a standard Western Electric 500-type telephone set, the following elements and element values have given satisfactory results:

Transistor 13: Western Electric 12A
Resistors 14 and 15: 10 ohms
Resistor 16: 7500 ohms
Resistor 17: 6800 ohms
Transmitter 18: Western Electric T1
Inductor 19: Western Electric 1535A
Diodes 20, 21, 22, 23: Western Electric 400A
Capacitor 24: 1.0 microfarad The amplifier may be made to fit into the handle of the telephone set. As has already been pointed out, it may be used to improve the transmitting efficiency of either a subscriber or an operator telephone set, particularly on long subscriber lines or on party lines. On party lines, the reduction of central office battery voltage is sometimes severe during revertive calls (calls between subscribers on the same party line) because of the shunting effect each subscriber's line has upon the other. Avoidance of additional voltage reduction in a polarity guard is, therefore, particularly desirable.

A final benefit afforded by the embodiment of the invention illustrated in FIG. 1 is improved lightning surge protection. Fixed resistors 14 and 15 in series with the emitter and collector electrodes of transistor 13 tend to limit any surge currents to a value not likely to damage transistor 13.

It is to be understood that the above-described arrangement is illustrative of the application of the principles of the invention. Numerous other arrangements may be devised by those skilled in the art without departing from the spirit and scope of the invention.

What is claimed is:

1. In a telephone set connected to a subscriber line, a transmitter and an amplifier which comprises a transistor having its emitter-collector path connected across said line, means connecting said transmitter between the base and emitter electrodes of said transistor when the central office battery voltage at said line has one polarity, and means connecting said transmitter between the base and collector electrodes of said transistor when the central office battery voltage of said line has the opposite polarity, whereby the operation of said amplifier is substantially independent of the polarity of the central office battery voltage on said line.

2. In a telephone set connected to a subscriber line, a transmitter and an amplifier which comprises a transistor having its emitter-collector path connected across said line, a diode bridge having one diagonal connected across said line, an inductor connected in series with said transmitter across the other diagonal of said bridge, and means coupling the junction between said transmitter and said inductor to the base electrode of said transistor, whereby the operation of said amplifier is substantially independent of the polarity of the central office battery voltage on said line.

3. In a telephone set connected to a subscriber line, a transmitter and an amplifier which comprises a transistor having its emitter-collector path connected across said line, a diode bridge having one diagonal connected across said line, an inductor connected in series with said transmitter across the other diagonal of said bridge, separate resistors connected from the base electrode of said transistor to opposite sides of said line to fix the bias on said base electrode, and a capacitor coupling the junction between said transmitter and said inductor to the base electrode of said transistor, whereby the operation of said amplifier is substantially independent of the polarity of the central office battery voltage on said line.

4. In a telephone set connected to a subscriber line, a transmitter and an amplifier which comprises a transistor having its emitter-collector path connected across said line, a diode bridge having one diagonal connected across said line, an inductor connected in series with said transmitter across the other diagonal of said bridge, separate resistors connected from the base electrode of said transistor to opposite sides of said line to fix the bias of said base electrode, a capacitor coupling the junction between said transmitter and said inductor to the base electrode of said transistor, and a pair of feedback resistors connected in series with the emitter-collector path of said transistor between said transistor and respective sides of said line, whereby the operation of said amplifier is substantially independent of the polarity of the central office battery voltage on said line.

5. In a telephone set connected to a subscriber line, a transmitter and an amplifier which comprises a transistor having its emitter-collector path connected across said line, a four-terminal diode bridge which includes two pairs of similarly poled series diodes connected from one terminal to the other of a first diagonal, means connecting the terminals of the other diagonal of said bridge to respectively opposite sides of said line, an inductor connected in series with said transmitter between the terminals of said first bridge diagonal, and a capacitor coupling the junction between said transmitter and said inductor to the base electrode of said transistor, whereby the operation of said amplifier is substantially independent of the polarity of the central office battery voltage on said line.

6. In a telephone set connected to a subscriber line, a transmitter and an amplifier which comprises a transistor having its emitter-collector path connected across said line, a four-terminal diode bridge which includes two pairs of similarly poled series diodes connected from one terminal to the other of a first diagonal, means connecting the terminals of the other diagonal of said bridge to respectively opposite sides of said line, an inductor connected in series with said transmitter between the terminals of said first bridge diagonal, separate resistors connected from the base electrode of said transistor to opposite sides of said line to fix the bias on said base electrode, a capacitor coupling the junction between said transmitter and said inductor to the base electrode of said transistor, whereby the operation of said amplifier is substantially independent of the polarity of the central office battery voltage on said line.

7. In a telephone set connected to a subscriber line, a transmitter and an amplifier which comprises a transistor having its emitter-collector path connected across said line, a four-terminal diode bridge which includes two pairs of similarly poled series diodes connected from one terminal to the other of a first diagonal, means connecting the terminals of the other diagonal of said bridge to respectively opposite sides of said line, an inductor connected in series with said transmitter between the terminals of said first bridge diagonal, separate resistors connected from the base electrode of said transistor to opposite sides of said line to fix the bias on said base electrode, a capacitor coupling the junction between said transmitter and said inductor to the base electrode of said transistor, a pair of feedback resistors connected in series with the emitter-collector path of said transistor between said transistor and respective sides of said line, whereby the operation of said amplifier is substantially independent of the polarity of the central office battery voltage on said line.

No references cited.

WILLIAM C. COOPER, *Acting Primary Examiner.*

H. ZELLER, *Assistant Examiner.*